BY

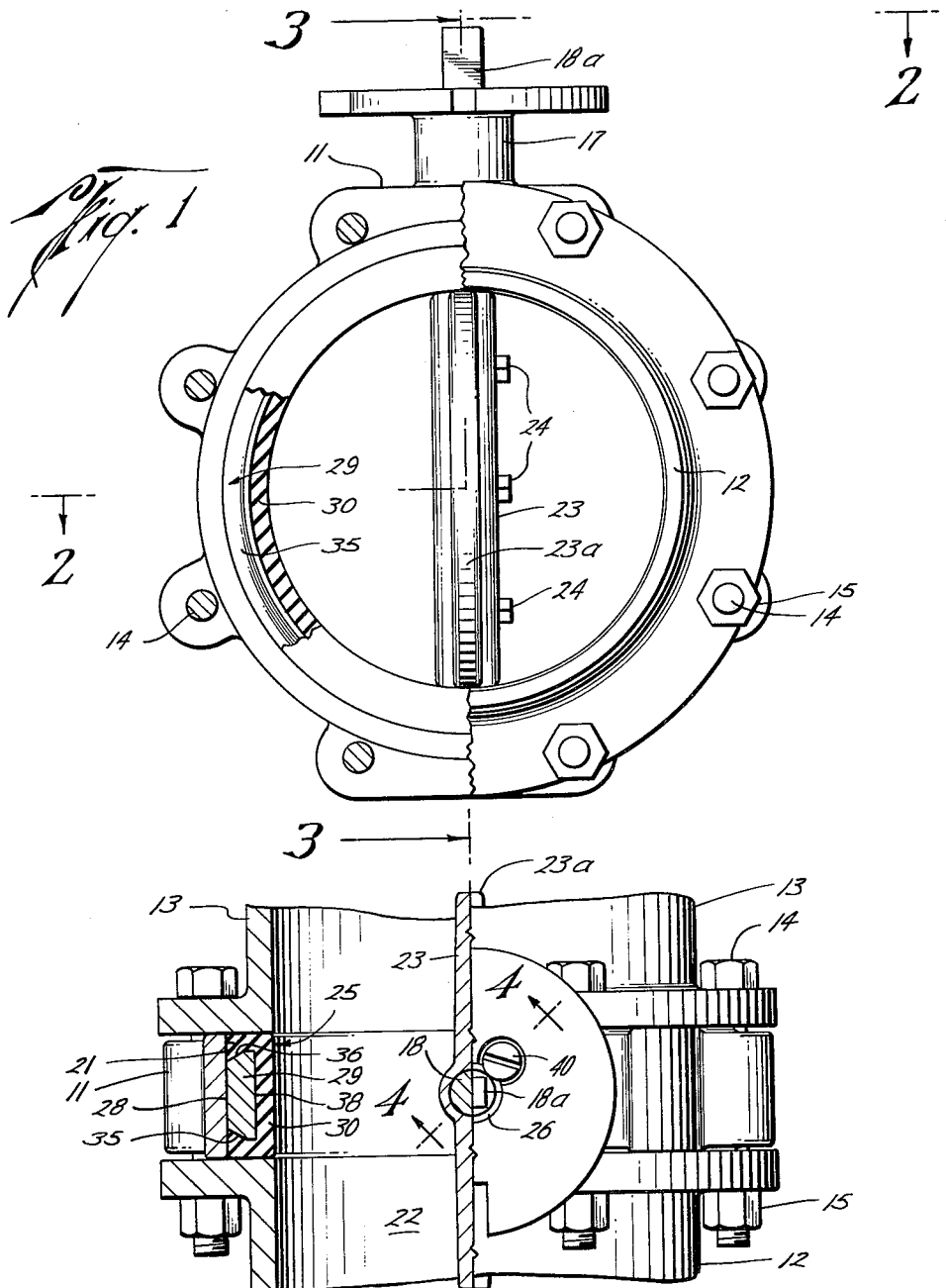

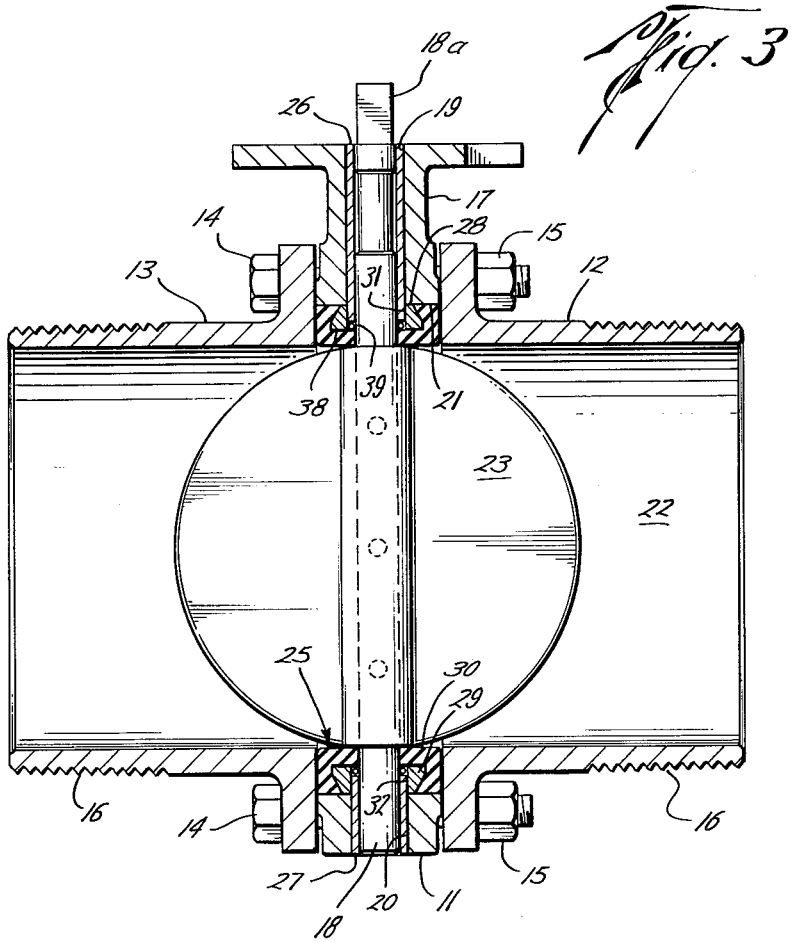
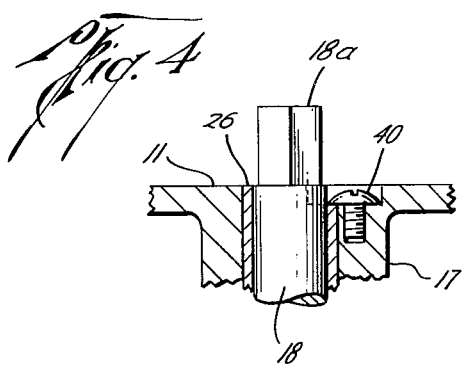
Crawford K. Stillwagon
INVENTOR.
BY Browning, Simms,
Hyer & Eickenroht
ATTORNEYS Crawford K. Stillwagon
INVENTOR.

ATTORNEYS

United States Patent Office 3,233,861
Patented Feb. 8, 1966

3,233,861
BUTTERFLY VALVE HAVING REINFORCED SEAT STRUCTURE
Crawford K. Stillwagon, Houston, Tex., assignor to Keystone Valve Corp., Houston, Tex., a corporation of Texas
Filed Oct. 10, 1961, Ser. No. 144,813
2 Claims. (Cl. 251—148)

This invention relates to the improvements in valves and refers more particularly to valves of the character known as butterfly or disc valves.

This application is in part a continuation of the prior copending application filed May 10, 1961, Serial No. 109,215 and now abandoned.

The valves that are used in certain services, such as in food processing, must sometimes be adapted to operate in a pressure range of from sub-atmospheric up to about 150 p.s.i. In such valves, it is particularly desirable that the valve be economical to manufacture, readily installed in a conduit system, easily maintained by replacement of the wearable parts without disturbing the fittings for securing the valve in a conduit and one which permits the valve to be installed with different types of fittings, including welded end, flange end, screw end and the like in a conduit system. The valve disclosed in the patent to C. K. Stillwagon, 2,740,423 is one type especially well suited for the above services and more than amply meets the qualifications heretofore enumerated.

The present invention is directed toward providing an improved valve which retains the advantages of the valve of the Stillwagon patent and has the following features. The valve body may be simply and economically machined so that the inner surface of the body surrounding the flow passageway therethrough is parallel to the flow axis of the flow passageway. This avoids complicated and expensive machining of grooves, ridges and other forms of seat retaining means in the valve body. Because the inner surface is parallel to the flow axis, the resilient valve seat can be arranged to be slidable in the flow passageway so that it can be inserted into an operable position within the valve body from one of its ends without any distortion and thus is readily replaceable. It is obvious that distorting the resilient seat in its installation and removal from a valve body tends to reduce its useful life and is very difficult, the difficulty being present in all sizes, but much greater in some sizes than in others. The installation of such seat in valves of the present invention is of equal facility in all sizes, being independent of the size of the valve. Further, in the valve of the present invention the openings in the seat and body which receive the operating members, such as the stem, are easily and readily aligned with a complementary opening in the valve body during the positioning of the seat in the valve body. Some known valves have required that the openings be placed into exact alignment before the seat was mounted because once it was mounted the tightness with which the seat engaged the surface of the valve body prevented further aligning movement. Finally, in certain instances in which valves of the Stillwagon type are to be mounted between flanges, and the pipe ends are not the exact thickness of the valve body from each other, the flanges are made with central openings large enough to fit around the pipe, and are adjusted until their faces are properly spaced, and then welded to the pipe. Since the inner surface of the valve seat is normally the same as the internal diameter of the pipe, it will be smaller than the internal diameter of the flange, and if the end of the pipe does not project to the face of the flange the inner corner portion of the seat will tend to be extruded into the opening in the flange. This invention provides a way of avoiding such extrusion. It also provides in one aspect a means of adequately anchoring the seat without the uncertainties of bonding rubber or the like to metal.

Therefore, it is an object of the present invention to provide a valve utilizing a replaceable resilient seat so arranged that it can be very quickly mounted in the valve body without distortion and the openings in the valve body and seat can be easily aligned during such mounting.

Another object is to provide a valve according to the preceding object where the installation of the valve closure operating member securely locks the resilient seat in an operable position in the valve body.

A further object is to provide a valve of the present invention where the resilient seat may be securely locked in an operable position by means independent of the valve closure operating member so that the latter member can be removed without releasing the seat from the valve body.

Yet another object is to provide a valve of the character described in which the resilient seat is positively held in place both for the use of the valve in pressure or suction services without auxiliary clamping means for securing the seat.

Another object is to provide in this type of valve a resilient seat so arranged that it forms a positive seal between the valve body and the fittings for securing the body in a conduit system and between the body and disc and the stem and valve body.

Another object is to provide a seat for such a valve in which the sealing material will be reinforced adjacent the sealing surface at all points by being bonded directly to a reinforcing body.

Another object is to provide such a seat in which the difficulties and uncertainties of bonding rubber or the like to metal will be avoided.

Other and further objects of the invention will appear as the description proceeds.

In the drawings which are to be read in conjunction with the instant specification and which constitute a part thereof, and wherein the same parts will be designated by like numerals in the various views:

FIG. 1 is an end elevation partially in section illustrating a valve embodying one form of this invention;

FIG. 2 is a plan view partially in section taken along line 2—2 of the valve of FIG. 1;

FIG. 3 is a section taken along line 3—3 of the valve of FIG. 1 showing the valve closure and stem in elevation;

FIG. 4 is a fragmentary view in section taken along line 4—4 of FIG. 3;

Figure 5:
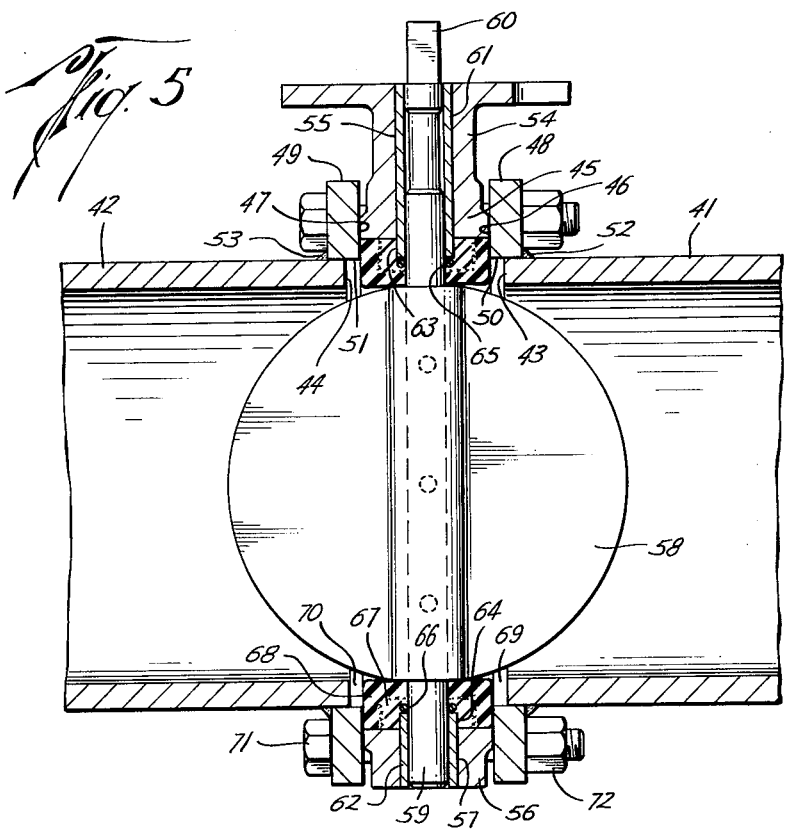
FIG. 5 is a view similar to FIG. 3 showing a modification.

Referring to FIGS. 1 and 3 of the drawings, there is illustrated a valve comprised of a valve body 11 releasably secured to flange members 12 and 13 in a metal-to-metal abutment with the ends of the body to provide fittings for securing the valve within a conduit. Bolts 14 and their associated nuts 15 are provided for securing the flange members to the body.

The flange members 12 and 13 are shown as flange fittings having external screw threads 15 on their extremities remote from the valve body 11 for the purpose of securing the valve in a conduit. Although only flange fittings having external screw threads are shown, the end fittings may be of various usual types suited for connection in a conduit.

As can best be seen in FIGS. 2 and 3, the valve body has an opening or flow passageway 22 formed therethrough which has an inner surface or wall 21 surrounding the passageway 22 that is parallel to the flow axis of the passageway.

The valve body 11 is shown as being of tubular construction with an upstanding neck 17 formed thereon. The neck 17 and body 11 are apertured at 19 and 20, respectively, to receive a valve stem 18. The stem 18 is removably mounted in such apertures for rotation about an axis normal to the flow axis of the passageway 22. The stem 18 is provided with a noncircular surface on its projecting end 18a whereby conventional rotating means (not shown) can be secured thereto to operate the valve. A valve disc 23 is bored to receive stem 18 and is operably mounted thereon within the flow passageway 22 of valve body 11 by means of studs 24.

The valve of the present invention utilizes a resilient seat in a novel arrangement so that it is easily positionable within the valve body 11 about the flow passageway 22 to coact with the valve disc 23 to control flow through the valve 10 and which provides the advantageous features previously recited.

The novel arrangement of such resilient seat is shown most clearly in FIGS. 2 and 3 and takes the form of a seat insert assembly 25 that can be very quickly slipped into and out of the valve body 11 without distortion. The seat insert assembly 25 is comprised of a rigid core 29 that integrally carries a resilient seat 30. The seat 30 may be integrally bonded by vulcanization to the core 29 or otherwise integrally connected therewith to form a unitary item that can be handled as a single member rather than two separate items.

The core 29 is shown as being constructed of a rigid non-yielding material such as metal and is manufactured separate from valve body 11. It preferably has a cross section of a dovetail configuration with its sides 35 and 36 diverging outwardly in a direction toward the flow axis of the flow passageway 22 for reasons which will be more fully set forth. However, other cross-sectional shapes may be used but with less desirable optimum results.

The seat 30 may be of a resilient material, such as rubber, or neoprene or other synthetic, with hycar constituting the preferred material for use with oily or gritty substances. This material is relatively soft, with a durometer value within the range of between 55 to 70 having been found to be very satisfactory. Higher values are desirable for certain situations as hereinafter disclosed.

The seat insert assembly 25 is provided with an exterior mating surface 28 complementary to the inner surface or wall 21 of the body 11 surrounding flow passageway 22 and parallel to the flow axis thereof so that it can be moved axially into and along the flow passageway 22 from at least one and preferably from either end of the valve body 11. The valve body 11 is preferably tubular with the passageway 22 circular in cross section because of the ease of fabrication of such shape, and, therefore, the exterior mating surface 28 of the insert assembly 25 in such construction is cylindrical to slidably interfit therewith. Thus, the insert assembly 25 is easily slidably positionable within the valve body 11 and also can be rotated about its own axis relatively to the valve body to properly align the stem openings therein with those in the body.

The insert assembly 25 is provided with stem openings 31 and 32 of such dimension as to receive stem 18 therein and with such disposition that the insert assembly 25 can be positioned in the valve body 11 to align openings 31 and 32 with stem apertures 19 and 20 in valve body 11. Thus, when the seat insert assembly 25 is slidably positioned in valve body 11 with the openings in alignment with the apertures in the body 11, the stem 18 can be mounted in the body and passed through the seat insert assembly 25 to securely lock it in an operable position in the valve body 11. This is an important advantage provided by the present invention in that the stem can, without any auxiliary means, hold the seat in an operable position in the valve body.

However, the apertures 19 and 20 in valve body 11 and the openings 31 and 32 in the insert assembly 25 may be enlarged if desired so that sleeves 26 and 27 are mountable coaxially on stem 18 and extend from the valve body 11 into the insert assembly 25 on each side of the disc 23. This arrangement securely locks the insert assembly 25 within an operable position in the valve body 11 independently of the stem 18 and allows the stem 18 and disc 23 to be removed from the valve without allowing the insert assembly to move axially in passageway 22 when the valve body is dismantled from flange members 12 and 13. The sleeves also provide a journal bearing mounting for the stem in the valve body.

Means releasably securing the sleeve 26 in valve body 11 are provided and as seen in FIG. 4 may take the form of machine screw 40 threadedly connected to the valve body and having at least a portion of its head overlying a part of the outwardly facing end of the sleeve 26. This arrangement is advantageous as the sleeve is secured in the body and also prevented from rotating with the stem. Similar means may be used to secure sleeve 27 in the valve body 11, which means have not been shown in an effort to simplify the drawings.

The valve body 11 may have an inner surface or wall 21 parallel to the flow axis of passageway 22 with a cross section other than circular. In such instance the exterior mating surface of the insert assembly will act as a positioning means so that the insert assembly 25 will be automatically positioned angularly relative to the body 11. The openings 31 and 32 are placed in the insert assembly in such disposition that when the latter member is in its predetermined angular position in body 11, the openings and apertures will be in alignment.

Preferably, the stem 18 passes centrally through the seat insert assembly 25, especially through core 29, to provide maximum stability against displacement. For this reason, the rigid core 29 should have a width greater in dimension than the thickness of stem 18 but less than the dimension of the valve body 11 taken along wall 21. The rigid core 29 extends inwardly from the body in a direction toward the flow axis of the flow passageway 22.

The resilient seat 30 has an end portion on each side of the core 29 adapted to fill the space between the sides 35 and 36 of core 29 and the flange members 12 and 13 when the seat 30 is under compression. The seat 30 also has a portion extending across surface 38 of core 29 facing the flow axis of passageway 22. The end portions are joined by the portion extending across surface 38 of core 29 to form a continuous web of resilient material which comprises seat 30. Whenever the core 29 has a dovetail cross section, the flange members 12 and 13 act especially well as efficient compression means to urge the end portions of seat 30 against the sides 35 and 36 of core 29 and against the inner wall 21 of valve body 11. This provides a fluid tight seal and also positively holds the seat in place both for use of the valve in pressure or suction service without auxiliary clamping means for securing the seat.

The internal diameter of the seat 30 is somewhat smaller than the external diameter of the disc 23 at its edge 23a. Thus, the disc edge 23a engages and slightly compresses the resilient seat about the entire perimeter of the disc when it is in a closed position. The particular differential in diameters between the disc and seat is not particularly critical but should be sufficient to insure that disc 23 makes a tight engagement around its full circumference with the seat. The portion of seat 30 across the surface 38 of core 29 is, of course, interposed between the core 29 and the disc to provide this sealing function and also seals about the stem 18. This portion is always maintained in compression immediately surrounding the stem by the circularly shaped ends of the thickened portion of the disc. A further seal about stem 18 may be provided by interposing a pressure energized seal such as O-ring 39 between the inwardly facing ends of sleeves 26 and 27 and seat 30. Thus, the resilient seat 30 provides a positive seal between the valve body 11 and the flange members 12 and 13 for securing the valve body in a conduit and between the valve body 11 and the disc 23 and the stem 18 and valve body 11.

Assembly of the valve shown in FIGS. 1 to 4, inclusive, of the drawings with the valve body 11 disassembled from flange members 12 and 13 which remain in the conduit and stripped of its components is as follows: The seat insert assembly 25 is slidably positioned by axial movement along the flow axis of passageway 22 into the flow passageway 22 from either end of the valve body 11 and the openings in the assembly are aligned with the apertures in the body by rotation of the insert assembly relative to the body. The sleeves 26 and 27 are inserted to securely lock the assembly 25 in the valve body. The disc 23 is positioned in the valve body and stem 18 is inserted therein, after which studs 24 are installed nonrotatably connecting the stem to the disc. The valve body 11 is inserted between the flange members 12 and 13, after which the bolts 14 and nuts 15 are secured bringing the flange members into metal-to-metal abutment with the ends of the valve body 11. This compresses the end portions of seat 30 providing a positive seal between the body and flange members. The valve is then ready to be used to control flow through the conduit. Reversal of the preceding operation disassembles the valve.

Figure 6:
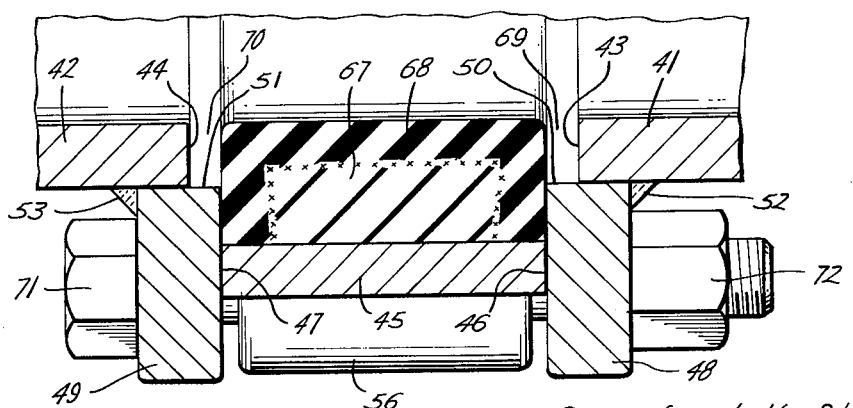
FIG. 6 is an enlarged fragmentary cross section through the valve body, seat and connecting flanges and pipe ends, of the modification illustrated in FIG. 5.

With reference to FIGS. 5 and 6 there is illustrated a situation in which the invention of this application is particularly useful. There is also illustrated a modified form of this invention in which the metal reinforcement of the seat member is replaced by a body of material similar to the material of the seat member except that it is made of substantially harder material so as to provide the necessary reinforcement. In this form of the invention the necessity for bonding rubber or the like to metal is eliminated by the substitution of the relatively hard reinforcing member of the same nature as the seat material for the metal member illustrated in FIGS. 1–4.

In FIGS. 5 and 6 the valve and seat member of this invention are shown inserted between pipes 41 and 42 whose ends 43 and 44 may be so spaced from each other that the distance between them is greater than the axial dimension of the body 45 between its end surfaces or faces 46 and 47. In order to closely embrace and accommodate the valve body under these circumstances, flanges 48 and 49 are employed having openings 50 and 51 therethrough of a size adapted to fit over and embrace the outer surfaces of the pipe ends 41 and 42, respectively. The flange members 48 and 49 may be of such thickness as to permit them to bridge the space by which the distance between the pipe ends 43 and 44 exceeds the thickness of the body member 45 between surfaces 46 and 47, and yet overlap the pipe ends 41 and 42. Thus the flanges 48 and 49 may be positioned on these pipe ends in embracing relation thereto and then moved toward each other until the distance between their adjacent surfaces is exactly that required to receive in proper relationship the body 45. In this position they may be secured and sealed to the pipe ends 41 and 42 by any suitable means such as welding 52 and 53.

As in the previously described forms of the valve, this body 45 is provided with a laterally extending stem portion 54 having a stem opening 55 therethrough, and with a laterally projecting boss 56 opposite the stem portion 54 and having a stem opening 57 therethrough in alignment with the stem opening 55. It is contemplated that within the valve body there will be a valve closure member in the form of a disc 58 fixedly carried on a valve stem or shaft 59 having a noncircular portion 60 on one end thereof whereby it may be turned by an appropriate handle or wrench so as to open or close the valve. In order to provide bearings for the end portions of the valve stem and additionally to lock the valve seat assembly in place there are provided bushings 61 and 62 adapted to fit within the valve stem openings 55 and 57, respectively, and to embrace the end portions of the valve stem 59 with sufficient snugness to provide an appropriate bearing therefor.

The valve seat assembly is shown as having openings at diametrically opposed points to receive the valve stem 59 and embrace the same and as being counterbored from its outer surface concentrically with said openings so as to receive the inner end portions of the bushings 61 and 62, respectively, thereby to be firmly secured within the valve body 45 and prevented from being displaced as long as the bushings 61 and 62 are in place. Preferably the bushings 61 and 62 fall short of reaching the bottoms of the counterbores 63 and 64 by an amount sufficient to provide space for seal rings such as O-rings 65 and 66 which serve to seal between the valve seat member, the bushing and the stem and prevent leakage along the stem.

The seat member modification shown in FIGS. 5 and 6 differs from that illustrated in FIGS. 1 to 4, inclusive, primarily in that the metal reinforcing ring 29 of FIGS. 1 to 4, inclusive, is eliminated and in place thereof there is provided a ring or core of material 67 which is of the same nature as the actual seat material 68 except that it is made somewhat harder and stiffer so as to provide the reinforcing necessary to accomplish the results of this invention. Although the material of the reinforcing ring 67 and of the seat material 68 need not both be rubber or both of the same kind of synthetic material, they should be of materials sufficiently compatible with each other so that they will readily bond together without the uncertainties and difficulties involved in bonding rubber or the like to metal as contemplated in the form of the invention shown in FIGS. 1 to 4, inclusive. It has been found that suitable results in most instances can be secured by making the material of the reinforcing ring or zone 67 of approximately 90 durometer rubberlike or synthetic material so as to be hard enough to provide the necessary reinforcement for the actual seat material of the seat 68, and to make the seat material of the seat 68 of approximately 65 durometer material or in some circumstances even softer as hereinbefore set forth in connection with FIGS. 1 to 4, inclusive. It will be understood that the hardness of the seat material, and to some degree that of the reinforcing ring material, may be varied depending upon the use required. The 90 and 65 durometer mentioned above are suitable for the particular situation illustrated in FIGS. 5 and 6 in connection with the problem created by the spaces left at 69 and 70 by the extension of the flanges 48 and 49 beyond the pipe ends 43 and 44.

It will be seen that due to the fact that the flanges 48 and 49 project beyond the pipe ends 43 and 44, there will be left, when the valve of this invention is inserted between the flanges, the spaces 69 and 70 between the pipe ends and the adjacent surfaces of the valve seat. With a valve seat as described in connection with FIGS. 1 to 4 and also with that illustrated in FIGS. 5 and 6, the valve seat material, being bonded substantially throughout its contact with the reinforcing ring to that ring, will be restrained at all points against movement away from that ring. Without such restraint it has been found that in a situation such as shown in FIGS. 5 and 6 the valve seat material tends to extrude and billow endwise into the spaces 69 and 70 and thus to flow away from the portions confined by the flanges 48 and 49 as well as away from the portions engaged by the disc 58 and thus be rendered less efficient. Furthermore, when allowed to bulge in such fashion and remain for a substantial period of time, they take on a semi-permanent set involving such bulge which greatly impedes their removal by moving the valve body laterally from between the flanges 48 and 49 and practically inhibits their reuse.

With the valve seat assemblies of the present invention in which the valve seat material is bonded throughout its confronting surface to the confronting surface of the reinforcing ring, it has been found that such bulging does not take place to an objectionable degree and that the efficiency of the seat assembly and its ready removability are preserved despite the presence of the gaps or openings 69 and 70.

It will be understood, of course, that as in the form illustrated in FIGS. 1 to 4, inclusive, the flanges of the form shown in FIGS. 5 and 6 will be secured together by suitable means such as bolts 71 and nuts 72.

It will be seen from the foregoing that there has been provided a valve having a valve body that can be economically formed and which utilizes a novel replaceable resilient seat arrangement that is very quickly mounted in the valve body without distortion and the apertures in the seat and body can be easily aligned during such mounting, greatly simplifying assembly of the valve.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve adapted to be clamped between two flanges in operation and comprising a body having parallel opposite end faces adapted to be engaged by such flanges when clamped therebetween, a seat-receiving flow opening interconnecting said faces, and a transverse stem opening intersecting said flow opening, a seat insert assembly endwise slidably fitted into said flow opening to slide endwise as a unit into and out of said body and extending through said flow opening and of an endwise dimension to be sealingly compressed endwise by such flanges when the same are clamped into engagement with said end faces of the body and of as great an inner diameter at its ends as at any point intermediate its ends, and having a transverse stem opening registering with said stem opening in the body, said seat assembly comprising a relatively hard strong solid core having endwise disposed clamping surfaces offset inwardly from the respective end faces of said body, said core engaging the surface of said body within said seat opening along a zone intermediate and spaced from said end faces to be thereby held against radially outward movement relative to the body, and a relatively soft elastomer seat extending over and providing the inner valve seating and flange sealing surfaces of said assembly and engaging the inner surface and clamping end surfaces of said core to be clamped between the core end surfaces and such flanges and forced into sealing engagement with the flanges and body providing a gasket type seal, said core and seat being both of a plastic material with the material of the core of greater hardness and less pliability than that of the seat, and being bonded together throughout their mutually opposed surfaces to restrain said seat against radially inward movement relative to said core when clamped to provide a gasket type seal, a disc type closure member within said seat of a size to provide a sealing compression of the seat against the core when the disc is in closed position, and a stem extending through said stem openings and engaging said disc to rotate the same between closed and open positions and fitting said stem opening through the seat with a sealing engagement.

2. A valve adapted to be clamped between two flanges in operation and comprising a body having parallel opposite end faces adapted to be engaged by such flanges when clamped therebetween, a seat-receiving flow opening interconnecting said faces, and a transverse stem opening intersecting said flow opening, a seat insert assembly endwise slidably fitted into said flow opening to slide endwise as a unit into and out of said body and extending through said flow opening and of an endwise dimension to be sealingly compressed endwise by such flanges when the same are clamped into engagement with said end faces of the body and having a transverse stem opening registering with said stem opening in the body, said seat assembly comprising a relatively hard strong solid core having endwise disposed clamping surfaces offset inwardly from the respective end faces of said body, said core engaging the surface of said body within said seat opening along a zone intermediate and spaced from said end faces to be thereby held against radially outward movement relative to the body, and a relatively soft elastomer seat extending over and providing the inner valve seating and flange sealing surfaces of said assembly and engaging the inner surface and clamping end surfaces of said core to be clamped between the core end surfaces and such flanges and forced into sealing engagement with the flanges and body providing a gasket type seal, said core being of a material of the same nature as the material of said seat but of a greater hardness than said seat and said core and seat being bonded together throughout their mutually opposed surfaces, a disc type closure member within said seat of a size to provide a sealing compression of the seat against the core when the disc is in closed position, and a stem extending through said stem openings and engaging said disc to rotate the same between closed and open positions and fitting said stem opening through the seat with a sealing engagement.

References Cited by the Examiner

UNITED STATES PATENTS

| | | | |
|---|---|---|---|
| 1,579,140 | 3/1926 | Phillips | 137—434 |
| 1,844,641 | 2/1932 | DeWein | 251—173 |
| 1,977,351 | 10/1934 | Phillips | 251—306 |
| 2,132,894 | 10/1938 | Esnard | 251—86 |
| 2,385,510 | 9/1945 | Harwood | 251—306 |
| 2,740,423 | 4/1956 | Stillwagon | 137—454.2 |
| 2,847,181 | 8/1958 | Muller | 251—306 |
| 2,853,267 | 9/1958 | Herren | 251—307 X |
| 3,118,465 | 1/1964 | Scaramucci | 137—454.2 |
| 3,122,353 | 2/1964 | Killian | 251—306 |

FOREIGN PATENTS 213,184  2/1958  Australia.

ISADOR WEIL, *Primary Examiner.*

H. WEAKLEY, *Assistant Examiner.*